Feb. 27, 1968   G. ILLING ET AL   3,371,055
PROCESS FOR PRODUCING SHAPED POLYAMIDE BODIES
Filed July 21, 1964
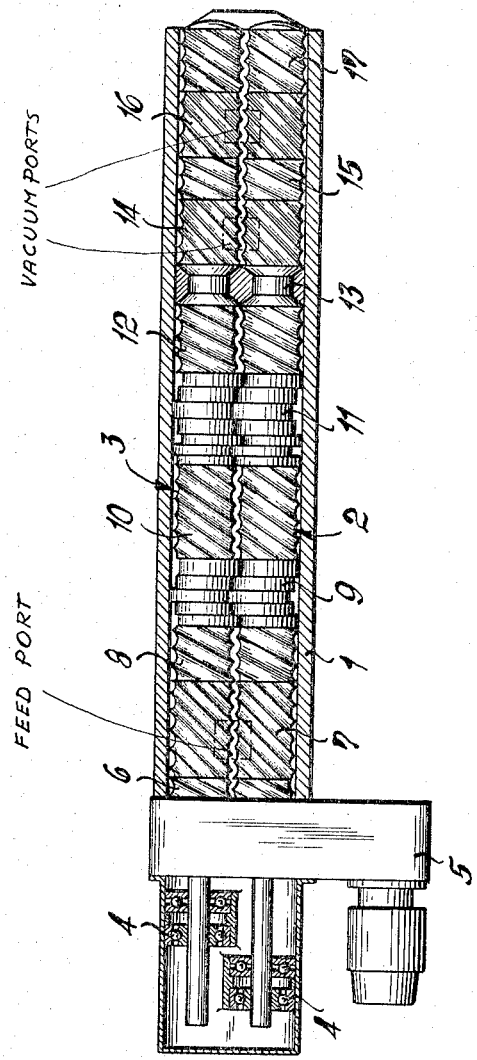
INVENTORS
GERHARD ILLING
FRANZ ZAHRADNIK
By Hane and Nydich
ATTORNEYS

United States Patent Office 3,371,055
Patented Feb. 27, 1968

3,371,055
PROCESS FOR PRODUCING SHAPED
POLYAMIDE BODIES
Gerhard Illing, Grossumstadt, and Franz Zahradnik, Ludwigshafen, Germany, assignors to Werner & Pfleiderer, Stuttgart-Feuerbach, Germany, a firm of Germany
Filed July 21, 1964, Ser. No. 384,151
Claims priority, application Germany, July 23, 1963, B 72,802
9 Claims. (Cl. 260—18)

ABSTRACT OF THE DISCLOSURE

An improved process of continually producing shaped polyamide bodies from polymerizable lactams, such as ε-caprolactam, with a suitable anionic catalyst and an activator in which process the initially produced polymer is partly depolymerized to a predetermined median molecular weight by subjecting the molten initial polymer to the action of shearing forces. The process has the advantage that polymers of controlled uniform median molecular weight and viscosity are obtained in a good yield.

---

It is known discontinuously to produce molded polyamide bodies in a mold by activated anionic polymerization of lactams in the presence of alkaline catalysts and activators and, optionally, i.e., if desired, pigments and/or dyes, at temperatures of preferably below 200° C. With methods of such kind it is advantageous first to prepare the so-called polymerization mixture consisting of the selected lactams, catalysts, activators and, if desired, usual additives at temperatures slightly above the melting point of the chosen lactam. After preparing the mixture of the components, it is immediately filled into a mold which is heated to the polymerization temperature. Upon completion of the polymerization, which is finished in a few minutes, the formed amide bodies may be removed from the mold. They generally have unmeasurably high K factors or values, high melt viscosities; and hence are practically unsuitable for working above their melting temperature. For production in series of polyamide bodies by the method described, the number of bodies which can be discontinuously produced per time unit is comparatively small. Furthermore, it is difficult to produce a homogeneously colored, formed body because the pigments dispersed in the lactam melt precipitate rapidly due to the low viscosity thereof, and, as a result, cavities and streaks may be formed. Finally the acidic dyes disturb the activated anionic polymerization.

It has now been found that polyamide bodies can be continuously produced by means of activated anionic polymerization from a polymerization charge or mixture consisting of lactam, activator, catalyst, and, if desired, additives; and forming the polyamide therefrom by intimately mixing the polymerization charge, melting the charge in a reactor, for example, a reaction tube provided with a force feeder, heating the melt to a temperature above the melting point of the forming polyamide, subjecting the molten polyamide to the action of shearing forces until the polyamide has attained the desired medium molecular weight, removing the volatile components from the polyamide under reduced pressure, shaping the molten polyamide melt in a conventional manner, and cooling the formed body.

Suitable lactams are those which have 6 to 12 carbon atoms in the ring, particularly caprolactam, caprylolactam, oenantholactam, capriolactam, laurolactam, which respectively are the ω lactams of hexanoic, octanoic, heptanoic, decanoic, and dodecanoic acids, substituted lactams, such as ε-ethyl-ε-caprolactam, zeta-ethyl-zeta-oenantholactam or methylenebis-caprolactam, which may be formed by the reaction of methylene-bis-cyclohexanones with hydroxylamine, and followed by Beckmann rearrangement. Also suitable, are pyrrolidone or piperidone, in particular in a mixture with the previously mentioned compounds. Whenever reference is made to polyamides hereinafter, this term is intended also to include mixed polyamides.

Suitable activators are, for instance, acylated lactams such as N-acetylcaprolactam or compounds which have acylating activity, such as isocyanates, bis-carbamido compounds, ketenes, acid chlorides, carbo-diimides, acid anhydrides or compounds which contain sulfonyl-, phosphenyl-, nitroso-, thiocarbonyl- or thiophosphenyl residues attached to the lactam nitrogen. Particularly suitable are compounds having the formulae:

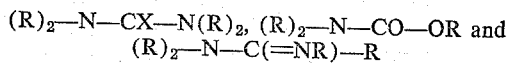

in which X designates oxygen, sulfur or the bivalent group >NR and R designates hydrogen or any suitable organic residue, whereof at least one R which is bound to nitrogen stands for an organic residue. Such compounds are, for instance, substituted ureas, thioureas, urethanes or guanidines which may be produced in known manner.

The activators are used in amounts of 0.01 to 15% by weight, preferably in amounts of 0.5 to 15% by weight, with reference to the weight of the lactam to be polymerized. Different quantities may be used for special purposes. Mixtures of activators of any selected proportions are, of course, also suitable.

The known catalysts may be used for polymerization catalysts, such as for example, the alkali metals or alkaline earth metals, for example, sodium, potassium, calcium or the oxides, hydroxides, carbonates, amides, or hydrides thereof, or the organometal compounds of the metals of the first to third main group of the periodic system of the elements. Particularly suitable are the alkali-lactamates, such as sodium caprolactamate, potassium caprolactamate in quantities of 0.5 to 5, preferably of 1 to 3 based on the weight of the polymerizable lactam.

Additives such as pigments, dyes, stabilizers, plasticizers or mold lubricants may be added alone or in mixtures to the polymerization charge. These additives may also be admixed to the polyamide.

Suitable pigments or dyes for producing dyed or colored polyamides according to the invention are: carbon black, cadmium selenide, cadmium sulfide, barium manganate, aluminates, such as cobalt aluminate, beryllium aluminate Be[AlO$_2$]$_2$, aluminum silicates, such as ultramarine blue, beryllium aluminum-silicate, metallic oxides, such as titanium dioxide, iron-, magnesium-, aluminum-, beryllium-, silicon- or chromium oxides, further, silicates which may be colored by metal oxides, silicate glass fibers, or phthalocyanine dyes. The substances which are used for coloring are preferably free from water and acid. They may be used in quantities of 0.01 to 5, preferably 0.1 to 3 parts per weight, based on the weight of the polymerizable lactam, without impairing the advantageous properties of the polyamides produced according to the invention.

Suitable stabilizers which in quantities of 0.01 to 2, preferably of 0.05 to 1%, by weight in relation to the weight of the polyamides, stabilize the polyamides against the action of light, air and heat, are, for instance: trinonylphenylphosphite, tri-phenylphosphite, potassium bromide, potassium iodide, 4,4'-diphenylenediamine and derivatives thereof.

For many purposes, as for example, for the manufacture of die-casting or injection molding or shaped bodies, it is advantageous to add plasticizers and mold lubricants which effect a suitable flow in the mold and prevent adhesion during the removal of the body from the mold. Such plasticizers are, for instance, calcium-, zinc- or sodium stearate, or substances which give to the polyamide bodies a finer crystalline structure such as polyethylenediamineoxalate. Such substances are preferably used in quantities of 0.05 to 0.5% by weight in relation to the total weight of the polyamides.

According to the invention, the activated anionic polymerization of the lactams is effected in a reaction tube which has a force feeder, and the polyamide is then formed in a known manner. First, the intimately mixed polymerization charge is compressed in the reaction tube, preferably at room temperature, and melted. The melt is then polymerized at temperatures which are preferably about 10 to 20° C. above the melting point of the evolving polyamide. The molten polyamide which still contains small quantities of volatile components is then subjected to the action of shearing forces, whereby the originally formed high molecular weight is reduced (partially depolymerized) until the desired medium molecular weight of the polyamide is reached. Finally, the volatile components which consist generally of unreacted monomeric lactams and possibly low molecular weight oligomers are removed from the polyamide under reduced pressure. The polyamides are shaped in a known and conventional manner, for instance, in molding devices used in die-casting or extrusion molding. These shaping devices are connected to the reaction tube.

An advantageous embodiment of the invention will now be described.

As a reaction tube with a force feeder, having zones which can be heated and cooled, an extrusion device is used, the force feeding means of which comprise two worm shafts rotating in the same direction and in self-cleaning engagement. The worm shaft comprises segments of different pitch so that the melts remain within the zones, which are formed by the segments, for different periods of time.

The powdered polymerization mixture is compressed in the melting zone and melted during the compression, whereby the temperature is preferably so selected that the polymerization mixture which is continuously fed into the extrusion device is melted within a short time, to wit: within about 5 to 50 seconds, preferably within 20 to 30 seconds. The melt is then fed into the polymerization zone which follows the melting zone. The melt is present within the polymerization zone in the form of a thin layer and is polymerized within 6 to 90 seconds while being intensively kneaded. Due to the polymerization and kneading heat, the temperature at the end of the polymerization zone increases to about 10 to 30° C. above the melting point of the evolving polyamide. Generally, the polymerization temperatures are between 90° and 250° C. The polymerizate is then forced into the so-called "shearing" zone which comprises a narrow, adjustable slit of 0.5 to 13 mm. between the rotary worm shafts and the surrounding jacket. The width of the slit which can be adjusted by pushing in or withdrawing adjustment jaws, movably mounted in the wall of the extrusion device, is so selected that the polyamides have melt viscosities between 500 and 8,000 poises, preferably 1,000 to 5,000 poises, after leaving the shearing zone due to the action of the shearing forces in said zone. The medium molecular weights are adjusted in accordance with the specific intended use of the polyamides. For die-casting or injection molding, they are preferably between 14,000 to 24,000, while for formed bodies which are formed by pressing the polyamide, for instance through a correspondingly formed nozzle plate at the discharge end of the apparatus, medium molecular weights of 20,000 to 50,000 are preferred. The overall range for depolymerization is from a median molecular weight of 14,000 to one of 50,000. The temperature of the polyamide melt which may rise briefly to 300 to 400° C. by the addition of energy in the melting zone is now lowered to a range between 250 and 300° C. in the so-called "degassing" zone. In the two-stage degassing zone the polyamide melt is stripped of volatile components (which consist primarily of lactam) to an extent such that the content of lactams in the polyamide is lowered to 0 to 4 weight percent, with reference to the weight of the polyamide. Preferably, the degassing is carried out under reduced pressure, approximately between 1 and 20 mm. Hg, whereby it is advantageous to heat high viscosity melts to temperatures of 260 to 300° C. to effect a more rapid removal of the volatile component. The degassing can be effected in one or several, preferably two, stages. The polyamide melt can now be die-cast or injection-molded by means of a conventional injection molding machine connected to the extruder. The melt can also be pressed, for instance, through a nozzle provided at the discharge end of the extruder. The body thus formed is then chilled in water. If the bodies to be formed are simple, and a loss of about 14% in volume is without importance, the polyamide can be simply poured without pressure. It is, of course, also possible to use the polyamides to produce chips by extruding the material in the form of a string which is chilled in water and then cut to pieces in the usual manner.

The method according to the present invention offers several advantages over methods as now known. According to the methods as heretofore known, the activated anionic polymerization of lactams is effected discontinuously in molds. In contradistinction thereto, the present invention permits a continuous manufacture of bodies formed from polyamides by anionic polymerization of lactams and shaping the produced polyamides. The invention also permits a combination of the final molding operation with the removal of the volatile components. As a result, polyamides with predetermined molecular weights can be produced.

The device for carrying out the method of the invention comprises a reaction tube including a plurality of zones which can be heated and cooled. This tube is equipped with means for feeding the polymerization charge at an inlet end of the tube and with means for varying the rate of travel of the charge and also the cross section of the tube in the central portion thereof. The tube may also be equipped with means for feeding additives to the polyamide melt, means for evaporating the monomers and the oligomers in the last part of the reaction tube, one or several worm shafts constituting forcible feeding means, bearings on the outside of the reaction tube for a one-sided support of the forcible feeding means, a stepless adjustable motor drive for rotating the worm shafts, and molding means on the side of the tube opposite to that on which the bearing for the forcible feeding means is arranged.

The heatable and coolable reaction tube is preferably made of refined or suitably alloyed steel and is constructed so that it is capable of sustaining pressures up to 100 atmospheres above atmospheric pressure and temperatures up to 400° C., especially in the shearing zone. It may consist of one piece, but it also can be formed of several pieces joined to each other, for instance, by flanges. The total length of the reaction tube depends upon the desired polymerization velocity and the desired properties of the polyamide. Suitable reaction tubes may have, for instance, an inner diameter of 100 to 300 mm. and a length of 1 to 4 meters.

Feeding of the polymerization charge at the inlet end of the reaction tube may be effected by conventional feed screws, dosing band scales or vibrating conveyor belts.

To effect variations of the cross section of the tube in the central part thereof, gradually adjustable setting jaws or other members may be provided so that an adjustable slit or gap between the rotary worm shafts and the adjustment members is formed. Adjustment jaws or members of this kind are produced, for instance, under code No. ZSK 53/1600 by Werner & Pfleiderer of Stuttgart, Germany, and are readily available in the market. The adjustable gradients of the velocity $$\left(G = \frac{\text{rotation velocity } V_2}{\text{gap width } (b)}\right)$$

are between 1,000 and 10,000 sec.$^{-1}$.

Suitable gear shafts may consist, for instance, of a cylindrical core upon which segments, such as worm bushings, exterior disks, or conical disks with different diameters and pitches, are seated and secured against rotation in reference to the core. The worm shafts may be formed of helical segments joined together, for instance, by bayonet locks.

A particularly suitable force-feeding means may comprise a combination of two mutually self-cleaning worm shafts with exchangeable segments which provide a compression factor of 1:2 to 1:5 in the melting zone by a reduction of the pitch. The force-feeding means is further equipped in the polymerization zone with stacks of eccentric disks so that the exposed surface of the mixture to be polymerized becomes very large while the volume remains very small, combined with an extensive kneading action for a small forced-feeding capacity. In the shearing zone, conical disks into which the adjustment members or jaws extend from the jacket are provided. The degassing zones preferably include worm segments with a high pitch to effect a large expansion of the polyamide melt. Between the degassing zones a worm segment with a low pitch is preferably provided, whereby the polyamide melt is compressed. The worm shaft of the discharge zone preferably includes a steeply cut segment with a very small pitch so that a sufficiently high discharge pressure is built up.

In some circumstances, one worm shaft is sufficient, whereas in cases in which high reaction heat is released, a combination of three or four shafts is preferable. The rate of rotation of the worm shafts is preferably adjustable between 10 and 300 revolutions per minute.

The bearings preferably are pressure bearings of the type which are conventionally used for extruders.

The power drive for a power load up to 10 kw. is preferably effected with an adjustable electric motor. If the load is up to 50 kw., a three-phase electric motor in conjunction with a regulating gear is preferably provided, and if the required load is still higher, a D.C. motor in conjunction with a Ward-Leonard regulator may be advantageously used.

To effect heating and cooling of the reaction tube, conventional devices for such purposes may be used, such as resistance heating, inductance heating, heated liquids or gas heating. Cooling may be effected by cooling liquids, gas cooling or water vapor containing air.

In the accompanying drawing an embodiment of the invention is diagrammatically shown by way of illustration, and not by way of limitation.

The reaction tube 1 includes a plurality of zones which can be heated or cooled, and is of equal inner diameter along its entire length. The tube houses two worm shafts 2 and 3 which serve as forcible feed means. They are supported at one end by means of bearings 4 located outside the reaction tube. The two shafts are rotated by a motor 5 in the same direction. The motor is of a type the r.p.m.'s of which may be gradually adjusted. Shafts 2 and 3 are formed of segments 6–17, the pitch of which changes. As a result, the reaction mixture is continuously transported through the reaction tube 1, but at different speeds in different zones. In the illustrated embodiment the segments consist of worm bushings, conical disks and kneading blocks including eccentric disks. On the basis of the operational stages which occur within the segments when and while the method of the invention is carried out, different zones may be distinguished. Segment 6 prevents the intrusion of the reaction mixture into the drive motor 5. The polymerization mixture is first fed into the feeding zone (segment 7) and then into the melting zones (segments 7 and 8), where it is liquefied and compressed. In the polymerization zones (segments 9–12) the melt, which begins to polymerize, is first formed into a thin layer or film by eccentric disks (segment 9). The thin layer is then transported by means of the transport zone (segment 10), in which the polymerization of the reaction mixture progresses further, to a kneading block (segment 11) formed of eccentric disks. The reaction mixture is here again distributed in the form of a thin film or layer. At the end of the polymerization zone (segment 12), in which the polymerization is practically completed, the viscous melt is transported into the shearing zone (segment 13) in which pressure is built up. Segment 13 is formed by seating upon cylindrical shaft portions conical disks and equipping the reaction tube with gradually or steplessly adjustable jaws or other suitable members so that an adjustable gap is formed between the rotary worm shafts and the adjustment members. In the shearing zone thus formed the polymerizate is exposed to shearing forces depending upon the viscosity thereof, the rate of rotation of the worm shafts, and the width of the gap, and is so selected that the desired viscosity of the molten polyamide is obtained. The polyamide, then in the degassing zone, is first relieved, then compressed, and finally again relieved. The degassing zone comprises two discharge sockets in which the worm bushings have a high pitch and in which a worm bushing with a low pitch is provided between the bushings with high pitches. In the first part (segment 14) of the degassing zone and volatile components of the mixture, such as the lactams, are removed. Then the mixture is compressed in a compression zone (segment 15) which is closed gastight against segments 14 and 16. Finally, the mixture is relieved in the second degassing zone. The polyamide melt, now liberated of lactams, is transported into a discharge zone (segment 17) which is disposed subsequent to the degassing zone (segment 16) and includes worm bushings which have a very low pitch but are cut steeply into the shafts. The polyamide melt is discharged under pressure from zone 17 through conventional molding means, such as nozzle head with profiles forming bores to effect the formation of threads, tubes, rods, ribbons, etc., as desired. The polyamide melt can also be fed to a die-casting or ejection molding machine in which the polyamide body of desired configuration is formed. The body is then chilled in water, as is customary.

The parts referred to in the subsequent examples are weight parts.

*Example 1*

One part of sodium caprolactamate, which has been prepared in a conventional manner, is intimately mixed at room temperature with 50 parts of ε-caprolactam (melting point 68.9° C.) and 1.8 parts of hexamethylene-bis-carbamido-caprolactam and 1 part of titanium dioxide. The mixture is continuously and uniformly fed into the extruder according to the figure by means of a feed worm. In the extruder it is compressed to a compression of 1:4 by means of worm shafts in segments 7 and 8 rotating at 85 r.p.m. The mixture is molten within 20 to 30 seconds. Prior to transporting the mixture into the polymerization zone formed by segments 9–12, the temperature rises to about 130° C. At this temperature the molten reaction mixture begins to polymerize in the polymerization zone. The temperature is now permitted to rise in this zone from 130° C. to about 230° to 240° C., whereby the polymerizate melts. The median dwell time during which the polymerizate remains within the polymerization zone is between 70 and 90 seconds. The polymerization is now practically completed, and the highly viscous melt (the viscosity of the melt is about 50,000 poises) is pressed into the shearing zone (segment 13) by means of worm segment 12. The width of the gap or slit in the shearing zone is 8 mm. After a dwell time in this zone of 1 to 3 seconds, one obtains a partially depolymerized polyamide which has a melt viscosity of 8,000 to 12,000 poises. The temperture of the melt rises, for an externally air-cooled reaction tube, in this zone to about 280° to 300° C. by the action of the shearing forces. The continuously rotating worm shafts now transport the melt into the first degassing zone (segment 14). The melt has a temperature of 280° to 300° C. and is 5 to 6% in weight, based on the total weight of the polymerization charge of the polyamide-forming starting materials. Most of the monomeric caprolactam is now vaporized or volatilized at a reduced pressure of 50 to 100 mm. Hg. In addition, about 0.5 to 0.7% of the oligomers of the caprolactam, which melt at above 300° C., are vaporized. After a dwell of 4 to 8 seconds in this zone, the melt is compressed in the compression zone (segment 15), which is closed gastight against segments 14 and 16 to about 30 atmospheres above atmospheric pressure, and in the second degassing zone (segment 16), is relieved at a reduced pressure of 10 to 30 mm. Hg, whereby further caprolactam (about 2.5 to 3.5% by weight) vaporizes from the melt. The polyamide melt, which now has a temperature of about 230° to 240° C., is finally pressed through a nozzle plate with sixteen perforations each of 5 mm. diameter. The nozzle is secured at the discharge end of the reaction tube and is heated to a temperature of about 230° C. The pressed-out polyamide mixture is immediately chilled in water, and the polycaprolactam is drawn off in the form of threads or strings. If the nozzle plate is replaced with a conventional drawing device for drawing rods with a bore of 6.5 cm., one obtains homogenous white-colored rods. The rod has a K value or factor of 93.4 (in accordance with the method of Fikentscher, Cellulose-Chemie, 13, 1932, p. 58). By extraction with ethanol, about 2.8% by weight of the oligomeric components can be dissolved out of the shaped polyamide body. The tensional strength of the rod made of polycaprolactam is 860 kg./sq. cm.

of 60 of the two worm shafts. The temperatures in the melting zone range from 25° C. in the feeding zone (segment 7) to 150° C. during the transition from segment 8 to segment 9. In the polymerization zone the temperature rises from 150° C. to 260° C. prior to the transition into the shearing zone, the gap width of which is about 3 mm. The shearing energy causes a rise of the temperature to 320° C., which decreases in the degassing zone to 240° to 320° C., and to 240° C. in the extrusion head for bands having a width of 12 cm. secured at the discharge end of the reaction tube. The mixed polyamide melts at 194° C. and has a K value or factor of 84 (measured according to Fikentscher, Cellulose-Chemie, 13, 1932, p. 58). The components which can be extracted from the band by means of ethanol consist predominantly of oligomeric components and are about 2.7 to 2.9% by weight, based on the weight of the mixed polyamide.

TABLE

| Reaction Components | | | | | | Reaction Conditions | | Reaction Products | | Shaped Body |
|---|---|---|---|---|---|---|---|---|---|---|
| A | B | C | D | E | X | n | y | K-Factor | Color | |
| 100 | 0.2 | ------- | 2 | 1.3 | Carbon Black | 190 | 0.5 | 68 | Black | (a) A spinning nozzle for forming strands having a diameter of 2.5 mm. |
| 100 | 0.3 | ------- | 3 | 0.3 | -----do----- | 100 | 5 | 94 | -----do----- | (b) A device for drawing rods having a diameter of 6 cm. |
| 100 | 0.1 | 1 | 5 | 0.1 / 1.0 / 3.0 | Carbon Black / $TiO_2$ / $Ba(MnO_4)_2$ | 60 | 4 | 108 | Gray | (c) A device for drawing rods having a diameter of 6 cm. |
| 100 | ------- | 2.6 | 2.5 | | | 90 | 8 | 98 | Blue | (d) A device for drawing tubes having a diameter of 1 inch. |
| 100 | ------- | 3 | 4 | 5.0 / 0.2 | $TiO_2$ / CdS | 120 | 3 | 78 | Ivory | (e) An attached die-casting machine for forming a chassis part weighing 3.2 kg. |
| 100 | ------- | 3 | 3 | 0.5 | CdSe | 80 | 13 | 120 | Red | (f) A nozzle plate for drawing a ribbon having a width of 15 cm. |

Example 2

A parts of caprolactam, B parts of sodium spheres, C parts of N-sodium caprolactamate, D parts of hexamethylene-bis-carbamido-caprolactam, and E parts of a pigment X are mixed under temperature conditions according to Example 1 and polymerized. They are then pressed out through a slit having a width of y mm. by means of worm shafts rotating at n r.p.m., as is stated in Example 1. A subatmospheric pressure of 50 to 100 Torr (mm. Hg) is maintained in zone 14 and a subatmospheric pressure of 10 to 20 Torr in zone 6, in which the lactam is removed. The mixture is then formed in a known manner and cooled to temperatures below 200° C. As a result, the shaped bodies which are listed in the following table under (a) to (f) are obtained.

Example 3

A mixture of 80 parts caprolactam, 20 parts of laurolactam, 3 parts of N-sodium caprolactam, 4 parts of hexamethylene-bis-carbamido-laurolactam are polymerized in the illustrated device. The median dwell time of the reaction mixture in the polymerization zone (segments 9–12) is 160 to 180 seconds for a r.p.m.

Example 4

A mixture of 100 parts of laurolactam, 4 parts of sodium laurolactamate, 6 parts of hexamethylene-bis-carbamidolaurolactam, 0.5 part of sodium stearate, 0.1 part of tri-(nonylphenyl) phosphite, without degassing and with a gap width of 6 mm., otherwise as described in Example 1, is polymerized and formed into rods having a diameter of 4 cm. in a known manner. The polylaurolactam contains 2.1% by weight (relating to the obtained rod-shaped polylaurolactam) of extractable components and has a K value or factor of 90 (measured according to Fikentscher, Cellulose-Chemie, 13, 1932, p. 58).

If the width of the gap is changed by 10 mm., and polymerization is otherwise effected as described, one obtains a polylaurolactam which can flow without pressure into a mold. The K factor can no longer be measured, since the polyamide merely swells in concentrated sulfuric acid. The melt viscosity of this polyamide is about 25,000 poises at 260 C. The components of the polyamide which can be extracted with water or ethanol are 1.9 to 2.1% by weight.

Example 5

A mixture of 100 parts of caprylolactam and 5 parts of potassium caprylolactam are continuously polymerized with 4 parts of phenylene-1,4-bis-carbamido-caprolactam, as described in Example 1, with the exception of the removal of monomeric and oligomeric components in the segments 14 and 16, and formed into tubes. The polycaprylolactam has 2.8 to 2.3% by weight of extractable components in relation to the final product.

By adding up to 5% by weight of pigments and/or dyes, such as titanium dioxide, carbon black, barium manganate, cadmium selenide, cadmium sulfide, phthalocyanine, silicon dioxide or silicate glass powder to the polymerizate mixture, colored polyamides are produced. The K factors, depending upon the r.p.m. of the worm shafts and the adjustment of the gap or slit, are between 65 and 120 or more. They are the lower the narrower the width of the gap is adjusted and the higher the r.p.m. of the worm shafts.

Example 6

Twenty parts of caprylolactam, 30 parts of laurolactam, 0.2 part of sodium, 2 parts of hexamethylene-bis-carbamido-caprolactam as activator, 1 part of carbon black, and 0.3 part of zinc stearate are polymerized as described in Example 1. The result is a soft mixed polyamide which has the E-modulus of 700 kg./sq. cm. (solidification point) and a K value of 95 (measured according to Fikentscher, Cellulose-Chemie, 13, 1932, p. 58). By connecting a conventional nozzle with a wide slot at the end of the pressure tube made of steel, foils can be produced in a conventional manner. Such foils are highly stable against non-polar solvents, such as gasoline, benzine, diesel fuel, crankcase oil and other petroleum products.

From the foregoing description of the invention, it will be apparent that this continuous process in its basic aspects, comprises the following steps:

(1) Feeding the starting materials, which comprise fundamentally a mixture of (a) the lactam (or a plurality of lactams) and (b) the catalytic material (which broadly embraces the catalyst per se and the activator), into a first zone wherein the mixture melts;

(2) Moving the molten mixture from the first zone into a second zone where polymerization takes place;

(3) Moving the reaction mass from the second zone into a third zone where the polylactam produced in the second zone is partially depolymerized to reduce the molecular weight thereof to a lower, predetermined average molecular weight. (This third zone may also be kept under, or followed by a zone kept under, subatmospheric pressure to allow for vaporization (degassing) of the volatiles contained in the polymeric mass); and (4) Moving the degassified molten polymeric mass (of the predetermined average molecular weight) from the third zone into a discharge zone ready for feeding into shapers.

What is claimed is:

1. In a process for continually producing shaped polyamide bodies by activated anionic polymerization of at least one lactam along with at least one activator and at least one catalyst, and which process comprises shaping and chilling the polyamide bodies, the steps which comprise intimately mixing the polymerization charge, compressing and melting the charge in a reaction tube to form a melt, heating the melt to temperatures above the melting point of the resultant polyamide so that polymerization takes place, defining a restricted gap of from 0.5 to 13 mm. in width, forcing the melt through the restricted gap to subject it to the action of shearing forces whereby its median molecular weight is reduced to between 14,000 and 50,000 to produce a partly depolymerized product removing at a reduced pressure from the partly depolymerized product volatile components contained therein.

2. A process for continuously producing shaped polyamide bodies which comprises the steps of
   (a) heating a continuously fed mixture of at least one lactam having from 6 to 12 carbon atoms in its ring along with a catalyst and an activator to a temperature of from 10° C. to 20° C. above the melting point of the polyamide which results from the polymerization of the lactam to form a melt, and allowing the melt to polymerize;
   (b) defining a restricted gap of from 0.5 to 13 mm. in width and forcing the product of step (a) through the restricted gap to subject it to the action of shearing forces whereby its median molecular weight is reduced to between 14,000 and 50,000 to produce a partly depolymerized product;
   (c) subjecting the product of step (b) to subatmospheric pressure thereby to effectuate degassing of volatiles contained therein; and
   (d) shaping the product of step (c).

3. A process for continuously producing polyamide bodies which comprises the steps of
   (a) continuously feeding and compressing to a heated zone a mixture of at least one lactam having from 6 to 12 carbon atoms in its ring along with an anionic catalyst and an activator to raise the temperature of the mixture above the melting point of the polyamide which results from the polymerization of the lactam;
   (b) allowing the product of step (a) to polymerize;
   (c) defining a restricted gap of from 0.5 to 13 mm. in width and forcing the product of step (b) through the restricted gap to subject it to the action of shearing forces whereby its median molecular weight is reduced to between 14,000 and 50,000 to produce a partly depolymerized product;
   (d) subjecting the product of step (c) to subatmospheric pressure thereby to remove, in gaseous form, volatiles therefrom; and
   (e) shaping the product of step (d) followed by cooling thereof.

4. The process of claim 3 wherein the mixture in step (a) is composed of about 1 part of sodium caprolactamate, about 50 parts of E-caprolactam, about 1.8 parts of hexamethylene-bis-carbamido-caprolactam and about 1 part of titanium dioxide and wherein the gap of step (c) is about 8 mm.

5. The process of claim 3 wherein the mixture in step (a) is composed of about 100 parts of caprolactam, between 0 and 0.3 part of metallic sodium, between 0 and 3 parts of N-sodium caprolactamate, between 2 and 5 parts of hexamethylene-bis-carbamido-caprolactam and between 0.1 and 5.2 parts of a pigment.

6. The process of claim 3 wherein the mixture in step (a) is composed of about 80 parts of caprolactam, about 20 parts of laurolactam, about 3 parts of N-sodium caprolactam and about 4 parts of hexamethylene-bis-carbamido-laurolactam and wherein the gap of step (c) is about 3 mm.

7. A process for continuously producing polyamide bodies which comprises the steps of
   (a) continuously feeding and compressing to a heated zone a mixture composed of about 100 parts of laurolactam, about 4 parts of sodium laurolactamate, about 6 parts of hexamethylene-bis-carbamido-laurolactam, about 0.5 part of sodium stearate and about 0.1 part of tri-(nonylphenyl) phosphite to raise the temperature of the mixture above the melting point of the polyamide which results from polymerization of the lactam;
   (b) allowing the product of step (a) to polymerize;
   (c) defining a restricted gap of from 6 mm. to 10 mm. in width and forcing the product of step (b) through the restricted gap to subject it to the action of shearing forces whereby its median molecular weight is reduced to between 14,000 and 50,000 to produce a partly depolymerized product;
   (d) shaping the product of step (c) followed by cooling thereof.

8. The process of claim 3 wherein the mixture in step (a) is composed of about 100 parts of caprylolactam, about 5 parts of potassium caprylolactam, about 4 parts of phenylene-1,4-bis-carbamido-caprolactam along with pigments and dyes not exceeding 5 percent of the said three polymerization components and wherein the gap of step (c) is about 8 mm.

9. The process of claim 3 wherein the mixture in step (a) is composed of about 20 parts of caprylolactam, about 30 parts of laurolactam, about 0.2 part of metallic sodium, about 2 parts of hexamethylene-bis-carbamido-caprolactam, about 1 part of carbon black and about 0.3 part of zinc stearate and wherein the gap of step (c) is about 8 mm.

(References on following page)

References Cited

UNITED STATES PATENTS

| | | | |
|---|---|---|---|
| 2,735,840 | 2/1956 | Lynch | 260—78 |
| 3,017,391 | 1/1962 | Mottus et al. | 260—78 |
| 3,166,533 | 1/1965 | Wichterle et al. | 260—78 |
| 3,200,095 | 8/1965 | Wichterle et al. | 260—78 |
| 3,239,490 | 3/1966 | Gee et al. | 260—78 |
| 3,287,322 | 11/1966 | Zimmer et al. | 260—78 |
| 3,294,757 | 12/1966 | Church | 260—78 |

WILLIAM H. SHORT, *Primary Examiner.*

H. D. ANDERSON, *Assistant Examiner.*